United States Patent
Minks

(10) Patent No.: US 7,728,560 B2
(45) Date of Patent: Jun. 1, 2010

(54) POWER SYSTEM FOR PRODUCING LOW POWER DC VOLTAGE AT A LEVEL ABOVE A PEAK VALUE OF AN AC INPUT TO THE SYSTEM

(76) Inventor: Floyd M. Minks, 202 Carters Mills Rd., Brinson, GA (US) 39825

( * ) Notice: Subject to any disclaimer, the term of this patent is extended or adjusted under 35 U.S.C. 154(b) by 386 days.

(21) Appl. No.: 11/851,621

(22) Filed: Sep. 7, 2007

(65) Prior Publication Data
US 2008/0112197 A1    May 15, 2008

Related U.S. Application Data

(60) Provisional application No. 60/824,819, filed on Sep. 7, 2006.

(51) Int. Cl.
*H02H 7/06* (2006.01)
*H02P 9/00* (2006.01)

(52) U.S. Cl. .................. 322/28; 322/37; 363/53

(58) Field of Classification Search .................. 290/22, 290/23, 27, 28, 37, 99; 363/53; 323/237
See application file for complete search history.

(56) References Cited

U.S. PATENT DOCUMENTS

| | | | |
|---|---|---|---|
| 3,757,199 A * | 9/1973 | Minks | 322/28 |
| 4,791,349 A * | 12/1988 | Minks | 323/266 |
| 4,908,565 A * | 3/1990 | Cook et al. | 322/10 |
| 5,426,579 A * | 6/1995 | Paul et al. | 363/126 |
| 5,672,955 A * | 9/1997 | Minks | 322/33 |
| 5,729,120 A * | 3/1998 | Stich et al. | 323/237 |
| 5,942,818 A * | 8/1999 | Satoh et al. | 310/46 |
| 7,276,882 B2 * | 10/2007 | Minks et al. | 322/28 |
| 7,327,123 B2 * | 2/2008 | Faberman et al. | 322/37 |
| 2007/0285954 A1 * | 12/2007 | Minks et al. | 363/53 |
| 2008/0111422 A1 * | 5/2008 | Minks | 307/41 |

* cited by examiner

*Primary Examiner*—Nicholas Ponomarenko

(57) ABSTRACT

DC power for low power loads is provided for vehicles such as snowmobiles where the electrical system includes primarily AC power. DC voltage is provided for gauges and similar loads even though the peak value of the AC is below a desired level. Rectification and regulation of some energy from the alternator is used for supplying the DC power at a desired DC voltage that is above an alternator zero to peak value. A capacitor and a diode are connected in parallel from the alternator with rectifying circuit portions for supplying power to the DC load. A DC voltage monitor senses the DC voltage supplied to the DC load and prevents the DC voltage from rising above the desired voltage by controlling the first rectification, the second rectification, or both.

4 Claims, 5 Drawing Sheets

US 7,728,560 B2

POWER SYSTEM FOR PRODUCING LOW POWER DC VOLTAGE AT A LEVEL ABOVE A PEAK VALUE OF AN AC INPUT TO THE SYSTEM

CROSS-REFERENCE TO RELATED APPLICATIONS

This application claims the benefit of U.S. Provisional Application No. 60/824,819 filed Sep. 7, 2006 the disclosure of which is hereby incorporated by reference herein in its entirety and all commonly owned.

FIELD OF INVENTION

The present invention is generally related to AC and DC power systems, and more particularly to devices and methods for providing a DC current for low power loads within an electrical system using AC power.

BACKGROUND

Snowmobiles and other small recreational vehicles such as four wheelers typically have an electrical system including an alternator, usually the permanent magnet type, attached to the engine, and thus operating it at varying speeds and frequency with engine rpm variations. This alternator is typically attached to a voltage regulator to control the AC voltage such as shown in U.S. Pat. No. 5,672,955 the disclosure of which are incorporated herein by reference. FIG. 1 illustrates an arrangement of various headlamps and tail lamps shown as HL1 HL2 & TL which are connected generally without switches so that they're on at all times the vehicle engine is running. Various other loads represented by $r_L$ are controlled by switches such as S1.

As is typical in the industry today, the size of the alternator A is sufficient to produce rated voltage on the connected loads when the vehicle is moving, thus engine speed is above the point that would typically be clutch engagement. However, it is common in the industry at engine idle speed for the voltage produced by the alternator to be less than 50% of the rated voltage. Thus, the lamps are quite dim under idle conditions with the vehicle stationary. For both safety and marketing reasons, it is desirable to incorporate gauges, for some of these vehicles, to show vehicle speed and other parameters such as transmission status, fuel level, and four wheel drive engagement. These are a few examples of many possible functions of a multi function gauge. Typically gauges of this type are used on vehicles with a 12 volt DC electrical system to supply constant power to the gauge. Frequently these gauges contain microprocessor electronics that must be supplied power continually to function properly. While it is technically possible to redesign these gauges to work from a voltage lower than 12 volts DC, it is not economically normally feasible because of the very high quantities already in production for other applications such as automotive at nominal 12 volt DC. Thus, there is a need for modifying an electrical system, as illustrated with reference to FIG. 1 by way of example, for producing a 12 volt nominal DC output of sufficient current to operate a multifunction gauge.

SUMMARY

Methods of supplying direct current power for low power loads is provided for instrumentation on vehicles such as snowmobiles wherein the electrical system is primarily alternating current power. Typically, the headlights and other major electrical loads are supplied with nominal 12 volts AC at normal operating speeds, but at idle speeds this voltage typically drops to ½ or less of this voltage. Embodiments of the present invention provide means of supplying 12 volts dc for gauges and similar loads even though the peak value of the AC is below that level.

Methods and systems are provided for accomplishing a voltage boost. By way of example, a system for supplying AC and a regulated DC voltages from an alternator to separate AC and DC loads, the regulated DC voltage being greater than the alternator zero to peak voltage under some conditions, may include an inductor and a solid state switch that is operated by a control circuit to transfer energy stored in the inductor to said DC load. Further, the system may have at the time energy is being transferred from the inductor to the DC load, additional energy also being transferred from the alternator to the DC load.

A voltage doubling method may include components added to control and regulate the output voltage over the entire speed range of the engine. Yet further, an inverter containing a semiconductor switch may be used to control the current through an inductor used as energy storage means. The inductor receives energy from the alternator and transfers it to the 12 volt DC load as the switch is turned on and off.

For system embodiments including AC and DC loads, an alternator operating at a varying voltage and frequency may be connected so as to supply power to the AC load with a rectifier and regulator or rectification and regulation means to rectify and regulate at least some energy from the alternator so as to supply DC power to the DC load at a desired DC voltage, wherein the desired DC voltage is above a zero to peak value of the alternator under at least some operating conditions. The rectification and regulation incorporates the use of a capacitor and a diode connected in parallel from a first terminal of the alternator to a circuit terminal and may include a first rectifier connecting the first terminal to a second terminal of the alternator and a second rectifier connecting the second terminal for supplying power to the DC load. A DC voltage sensor senses the DC voltage supplied to the DC load and prevents the DC voltage from rising above the desired voltage by controlling at least one of the first rectification, the second rectification, and a combination thereof.

BRIEF DESCRIPTION OF THE DRAWINGS

For a fuller understanding of the invention, reference is made to the following detailed description, taken in connection with the accompanying drawings illustrating various embodiments of the present invention, in which.

DESCRIPTION OF EMBODIMENTS

By way of example, the present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference designations refer to like elements throughout.

Figure 1:
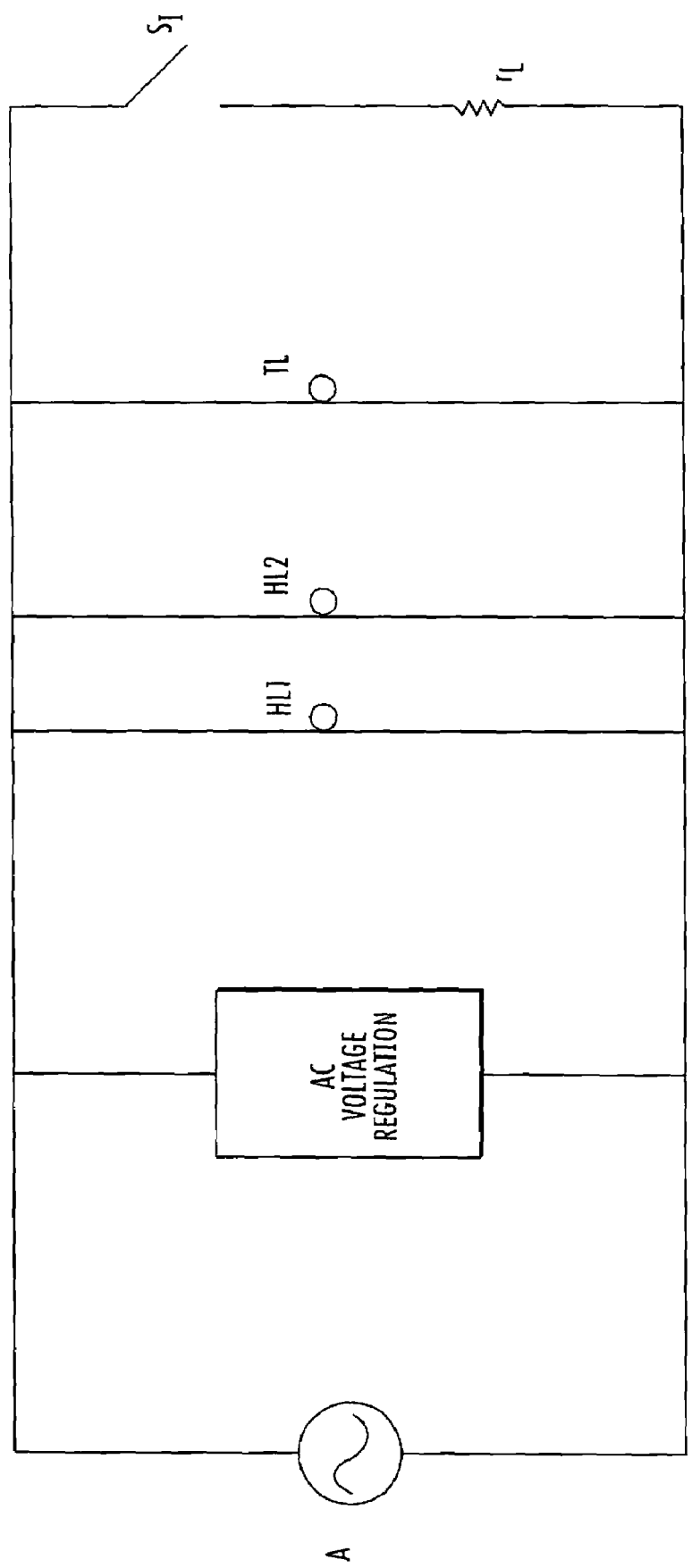
FIG. 1 is a schematic diagram of an electrical system.
Figure 2:
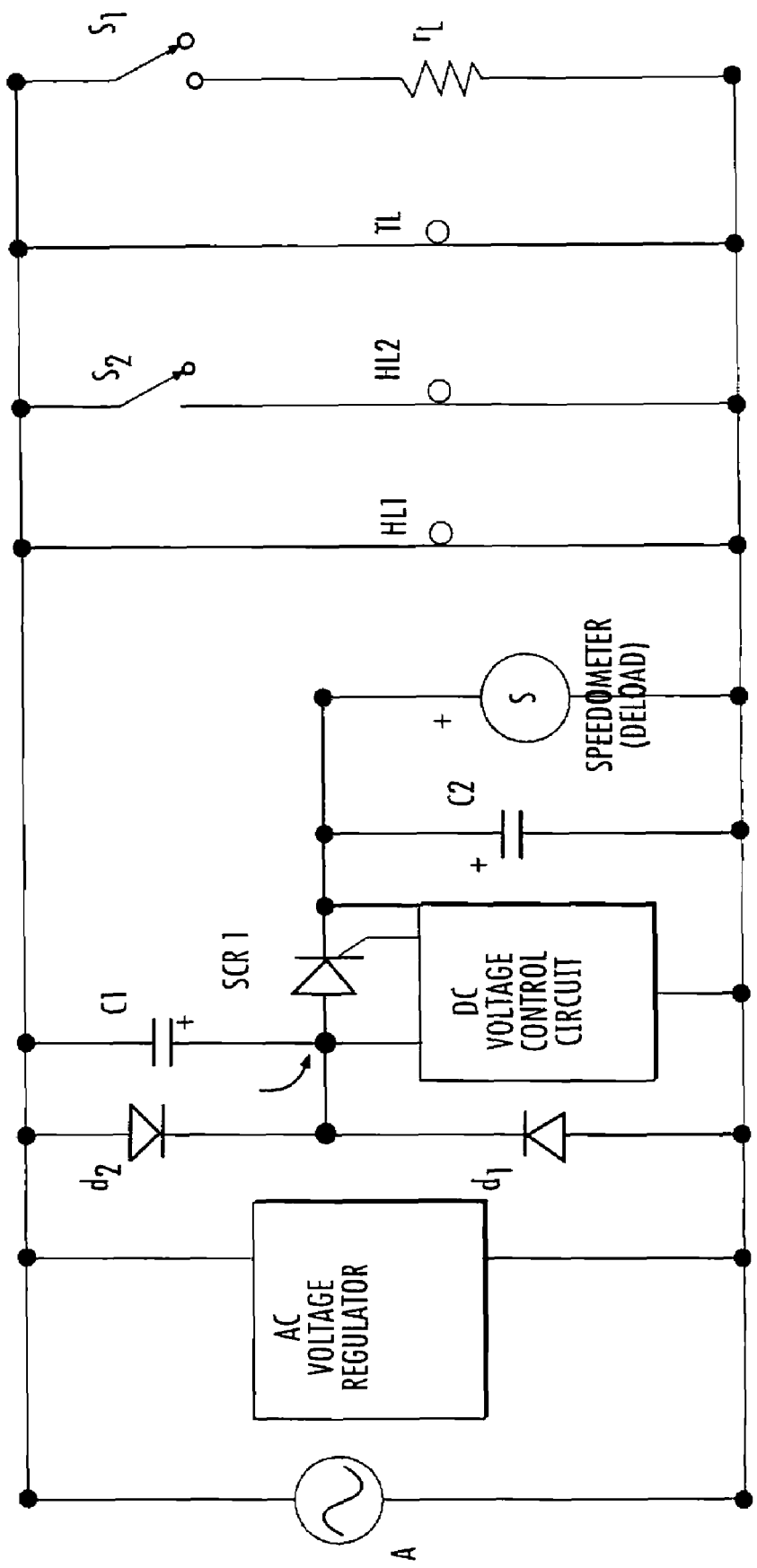
FIG. 2 is a schematic diagram of an electrical system having a display component.

With reference to FIG. 2, one embodiment of the invention is herein illustrated and described without again describing common components earlier described with reference to FIG. 1. Components are added to supply constant dc power to a gauge labeled as a speedometer, which in fact may be any multifunction display or other low power direct current load. A switch S2 is shown added in series with headlamp HL2. It is known that the light output of typical tungsten filament headlamps varies rapidly with voltage. Thus under idle conditions where the voltage to the lamps is well below rated, the total illumination may actually be higher with headlamp hl2 turned off. This is because the voltage increase on the system and thus on headlamp HL1 more than compensates for the lost output of headlamp HL2. It should be understood that switch S2 is not a mechanical switch operated by the operator but some automated switching method such as a solid state switch controlled by the voltage or frequency or the instantaneous change of voltage with time present on the electrical system. The switching function identified as S2 as above described is an optional part of the new components now to be described in FIG. 2. The rest of the circuit may function without the switch S2 or the functions just described. Switch S2, may function without the rest of the circuit components. If SCR1 is gated on then it can be described as functioning like a diode and in that case capacitor C1, diode d1, & SCR 1 will function as a known voltage doubler circuit capable of producing an output voltage across filter capacitor C2 and thus the speedometer. This voltage can be greater than the zero to peak voltage of the alternator A. The voltage control circuit removes gate drive from SCR1 if the voltage across C2 is at or above a selected level. As another version of this invention a second SCR could be substituted for d1 with its gate also connected to receive current to turn it on when the voltage control circuit sense the voltage below a second selected level. If the peak voltage of the alternator was sufficiently high, such as at high rpm current could flow through diode d2, (and still be controlled by SCR1 as previously described) to the speedometer and filter capacitor C2, the presence of a diode d2 will also prevent the reverse polarity charging of C1.

Figure 3:
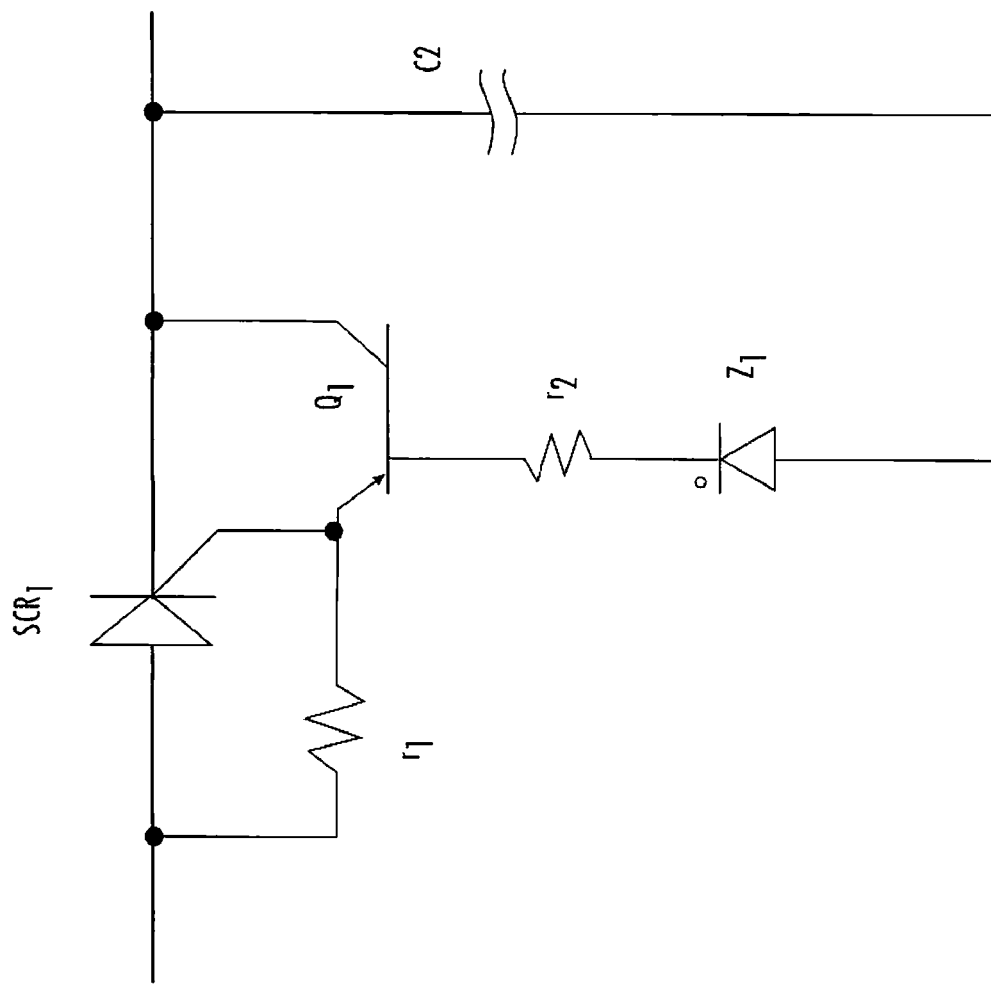
FIG. 3 is a schematic diagram of an electrical system having a voltage control circuit in keeping with the teachings of the present invention.

FIG. 3 illustrates a possible voltage control circuit. SCR1 & c2 in FIG. 3 represents the same components in FIG. 2. If, at a given instant, the anode of SCR1 is positive compared to the cathode, current will flow through resistor r1 to the gate. This would be appropriate for turning on SCR1. If the voltage across C2 exceeds the breakdown voltage of zener diode Z1 plus the emitter base saturation voltage of transistor Q1, transistor Q1 will be turned on thus shunning the current flowing through r1 away from the gate of SCR1 preventing it from being turned on. Thus the voltage on C2 is regulated at a desired and selected level controlled primarily by zener diode Z1. Many other configurations of dc voltage controlled circuits could be used in this application including microprocessor based voltage sensing circuit which might be particularly advantageous if a second SCR was substituted for d1 thus removing or minimizing voltage across capacitor C1 when the alternator was operating at high speed and therefore capable of high voltage.

Figure 4:
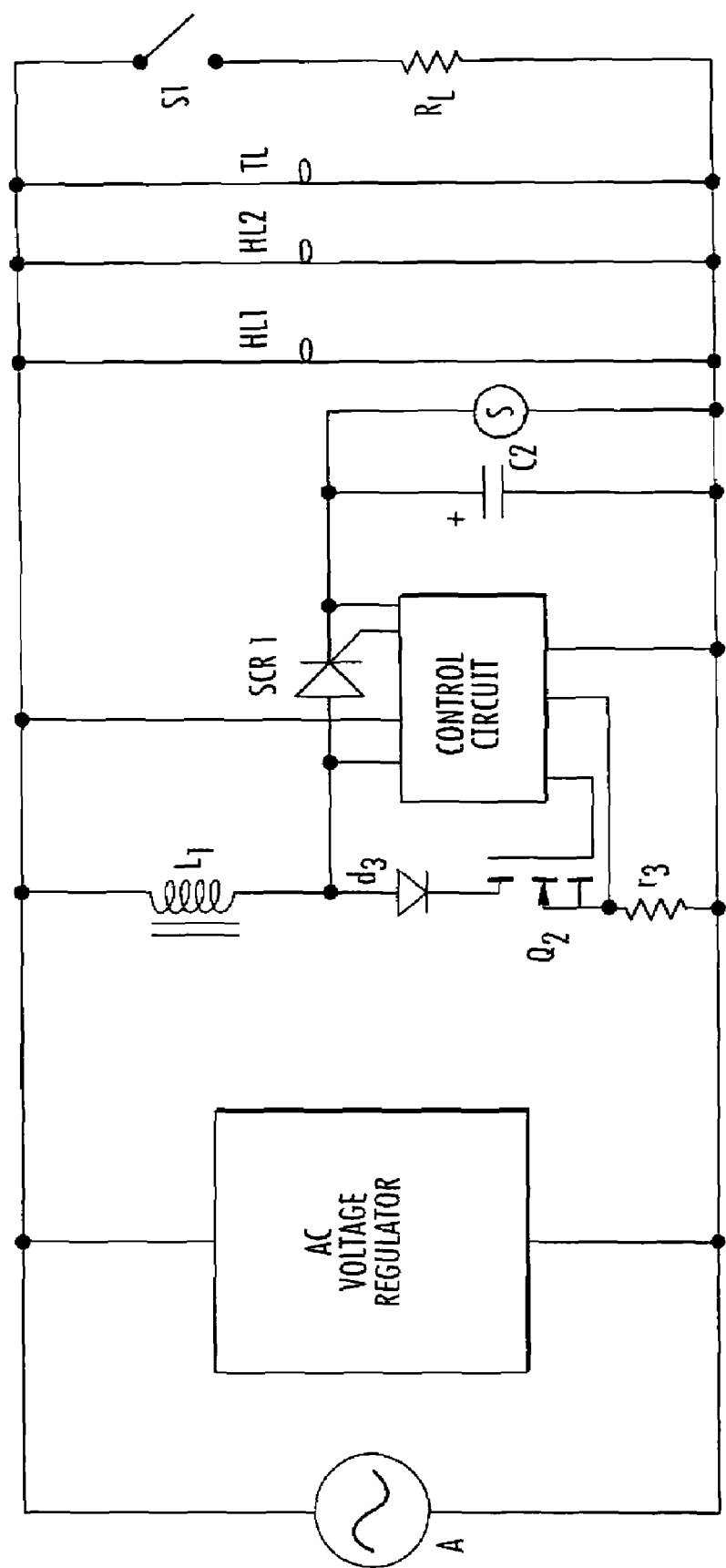
FIG. 4 is a schematic diagram of an alternate electrical system for supplying voltage to a multifunction gauge or speedometer in keeping with the teachings of the present invention, by way of example.

FIG. 4 illustrates an alternate method of supplying voltage to the multifunction gauge or speedometer, labeled as S, requiring a steady DC voltage which at some rpm is above even the zero to peak voltage of the alternator A. Components with the same designations as in previous figures are for the same purpose and therefore will not be described again here.

Inductor I1 is used as an energy storage device. When transistor q1 is turned on at an instant where the lead of alternator A connected directly to I1 is positive, current can flow through I1, d3, Q2 and r3 and back to the alternator. Thus as is known the current in I1 will rise at a rate proportional to the voltage across it. The voltage across resistor r3 is feed back to the control circuit to allow the control circuit to turn off Q2 when a sufficient or desired amount of energy is stored in the inductor I1. This is a known method disclosed in U.S. Pat. No. 4,705,013 the disclosure of which is herein incorporated by reference. When transistor Q2, used as a solid state switch, is switched off, the energy stored in the inductor I1 is transferred through SCR1 to capacitor C2. If, when Q2 is turned off, the alternator lead to which it is connected remains positive, the instantaneous alternator voltage is added to the voltage across I1. This reduces the average power that must be stored by I1. When the voltage across C2 as sensed by the control circuit reaches a desired level the switching of transistor Q2 can be reduced either in frequency or in the time on to maintain the voltage across C2 at the desired level. If the desired level can be maintained without switching Q2 on at all it may be left off and the voltage controlled at the desired level by the gating to SCR1. This can be done either through an analog circuit or, probably more economically through a microprocessor for the control circuit. U.S. Pat. No. 4,705,013 discloses a noise inherent in the components of the circuit to initiate the turn on of transistor Q2. Such a method is applicable here. However a pulse initiated by the microprocessor itself may also be utilized as will be clearly understood by one skilled in the programming of such microprocessors. Because of the input capacitate of Q2, once turned on Q2 will stay on for the time likely to be involved in a cycle in this type of circuit. Q2 will turn off when the control circuit removes the gate drive, as a result of a feedback signal generated by the voltage drop across the resistor r3.

Figure 5:
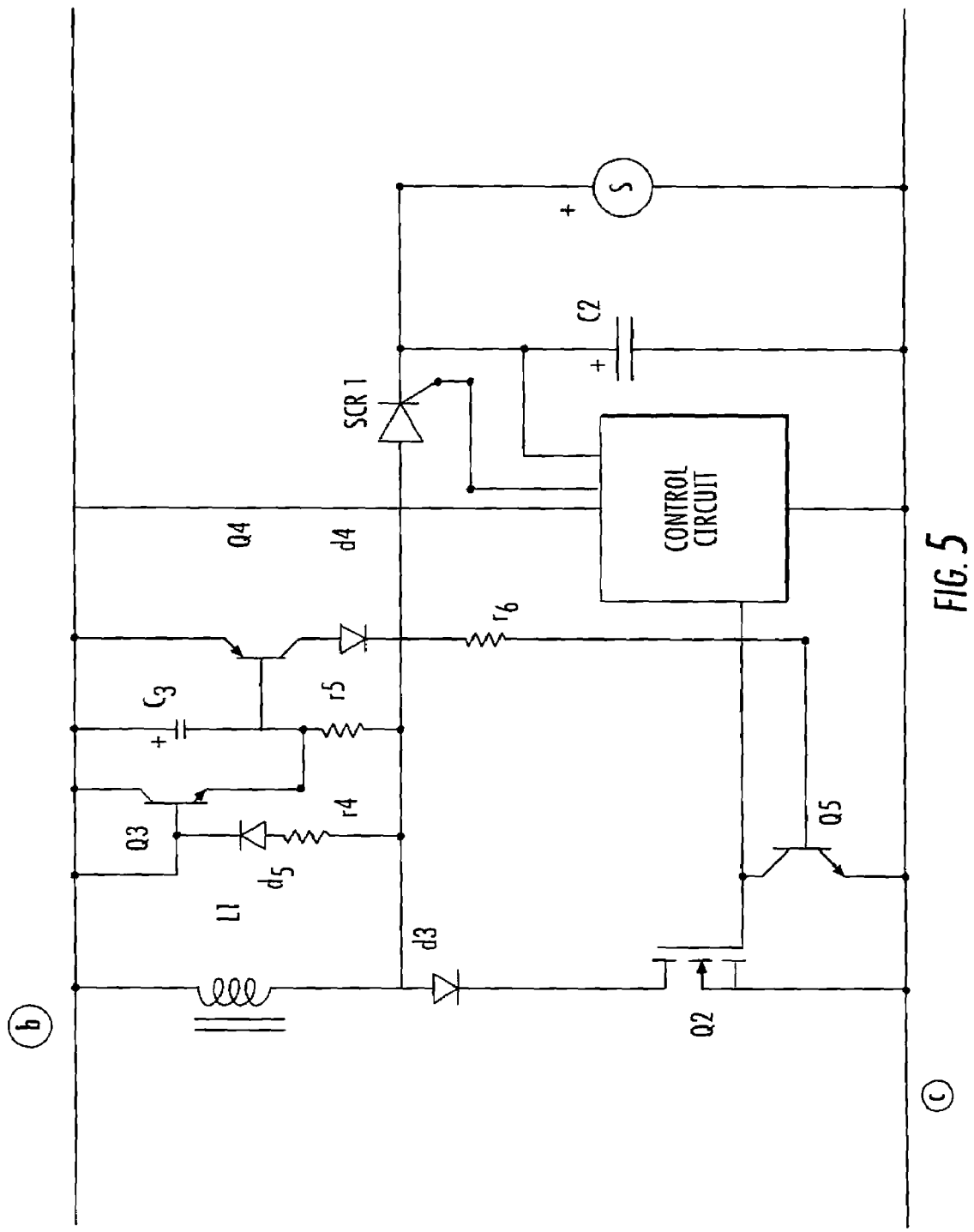
FIG. 5 is a schematic diagram of an alternate electrical system having one arrangement of an inductor and associated control circuit, by way of example.

FIG. 5 illustrates an alternative arrangement of the inductor I1 and the associated control circuit. The configuration of FIG. 5 is advantageous at very low voltages because the voltage drop across resistor r3 of U.S. Pat. No. 4,705,013 is eliminated. In FIG. 5 components with the same functions as previous figures are labeled with the same numbers and will not be described in detail again. The alternator A, AC regulator and load portions of FIG. 4 remain unchanged. L1 is used to alternately store energy from the alternator and then transfer it to capacitor C2. Q2, used as a solid state switch, is turned on and off to accomplish the energy transfer into and out off inductor I1. Field effect transistors such as that shown for Q2 can conduct in the reverse direction. Diode d3 is used to prevent reverse conduction through q2. Resistor r3 is eliminated and the function of determining a feedback signal to terminate the conduction of Q2 is performed by the components shown as analog components Q3, Q4, Q5, d4, d5, C3, r4, r5, and r6. If the voltage across capacitor C3 is small compared to the voltage appearing across inductor I1, then effectively C3 in series with resistor r5 will serve the mathematical function of integrating the voltage waveform across I1. Thus if the voltage across C3 is zero when Q2 is turned on for the beginning of a pulse, the voltage across I1 will produce a current through resistor r5 which will gradually charge capacitor C3 in the polarity shown. When the voltage across capacitor c3 reaches the base emitter turn on voltage or transistor Q4, transistor Q4 will be turned on allowing current to flow through d4 and r6 to the base of Q5 which then will allow conduction from the gate of transistor Q2 effectively providing a feedback signal to turn off transistor Q2. The voltage reference for this becomes the base emitter voltage to turn on transistor Q4. When Q2 is turned off the polarity across inductor I1 reverses thus the current flowing through resistor r4 is of the direction to turn on transistor Q3. This will rapidly discharge capacitor C3 to zero volts for the beginning of the cycle previously described. Diodes d4 & d5 prevent the flow of current of reverse direction through transistors Q4 & Q3 respectively. Resistor r6 limits the base current to transistor Q5. Many other methods of the inner connect would be obvious to those skilled in the art. Also, the control circuit if microprocessor based could itself measure the voltage across I1 at frequent intervals to determine the mathematical integral of that voltage.

In summary, a resistor and capacitor are used to create a voltage that is the integral of the voltage across the energy storage inductor. When this integrated voltage reaches a predetermined or desired level with which it is compared, a signal is supplied to remove the drive from transistor Q2. In this example the base emitter voltage to turn on transistor Q4 is the predetermined or desired level, and Q4 becomes the comparator. Other voltage references and comparators, or similar microprocessor equivalents can be used within the teaching of this invention. This integrated signal therefore controls the termination of the pulse of Q2. The initiation of the pulse is still under the control of the control circuit and is previously described the output voltage can still be controlled or regulated to a desired level by the control circuit, such as by the frequency of the application of the turn on pulses from the control circuit to Q2 or where the peak voltage at point b compared to c exceeds the required voltage on C2 by leaving Q2 off and controlling the gate or turn on signal to SCR1. It should be realized by one skilled in the art that numerous other semiconductor switching devices could be substituted for the n channel field effect transistor shown as Q2 and the SCR shown as SCR1. If a transistor was substituted for SCR1 as a switch it could be turned off part way through a cycle thus reducing the size of the capacitor C2 required since C2 would not have to absorb a half cycle of energy from the alternator as limited by I1 without creating excessive ripple voltage. During the cycle once the voltage on capacitor C3 reaches zero the current thru r5 will not continue to charge capacitor C3 in the negative direction significantly because the effective functions of the emitter and collector of transistor Q3 reverse. Even though the current gain is low in the reverse direction, it is sufficient to bypass the current from r5 with negligible voltage change on C3. Any other starting and ending voltages across C3 may be used if small compared to the voltage across I1.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of claims supported by this disclosure.

The invention claimed is:
1. A power system comprising:
an AC load and a DC load;
an alternator operating at a varying voltage and frequency, the alternator connected so as to supply power to the AC load;
rectification and regulation means to rectify and regulate at least some energy from the alternator so as to supply DC power to the DC load at a desired DC voltage, wherein the desired DC voltage is above a zero to peak value of the alternator under at least some operating conditions, wherein the rectification and regulation means contains a capacitor and a diode connected in parallel from a first terminal of the alternator to a circuit terminal, and wherein the rectification and regulation means further comprises a first rectification means connecting the first terminal to a second terminal of the alternator and a second rectification means connecting the second terminal so as to supply power to the DC load; and
means for monitoring the DC voltage supplied to the DC load and preventing the DC voltage from rising above the desired voltage by controlling the second rectification means.

2. A power system according to claim 1, further comprising the sensing means controlling the first rectification means.

3. A power system comprising:
an AC load and a DC load;
an alternator operating at a varying voltage and frequency, the alternator connected so as to supply power to the AC load;
rectification and regulation means to rectify and regulate at least some energy from the alternator so as to supply DC power to the DC load at a desired DC voltage, wherein the desired DC voltage is above a zero to peak value of the alternator under at least some operating conditions, wherein the rectification and regulation means contains a capacitor and a diode connected in parallel from a first terminal of the alternator to a circuit terminal, and wherein the rectification and regulation means further comprises a first rectification means connecting the first terminal to a second terminal of the alternator and a second rectification means connecting the second terminal so as to supply power to the DC load; and
means for monitoring the DC voltage supplied to the DC load and preventing the DC voltage from rising above the desired voltage by controlling at least one of the first rectification means, the second rectification mean and a combination thereof.

4. A power system comprising:
an AC load and a DC load;
an alternator operating at a varying voltage and frequency, the alternator connected so as to supply power to the AC load;
a rectifier and regulator operable with the alternator to rectify and regulate at least some energy from the alternator so as to supply DC power to the DC load at a desired DC voltage, wherein the desired DC voltage is above a zero to peak value of the alternator under at least some operating conditions, wherein the rectifier and regulator contains a capacitor and a diode connected in parallel from a first terminal of the alternator to a circuit terminal, and wherein the rectifier comprises a first rectifier circuit portion connecting the first terminal to a second terminal of the alternator and a second rectifier circuit portion connecting the second terminal so as to supply power to the DC load; and
a voltage monitor for sensing the DC voltage supplied to the DC load and preventing the DC voltage from rising above the desired voltage by controlling at least one of the first rectifier circuit portion, the second rectifier circuit portion, and a combination thereof.

* * * * *